FIG_1
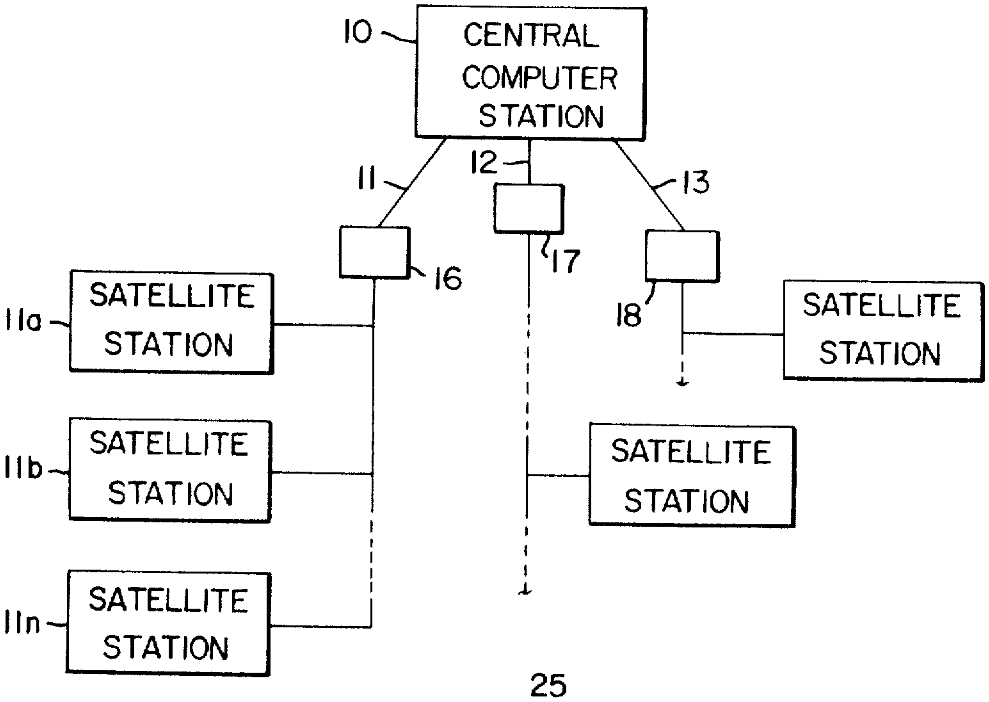
FIG_4
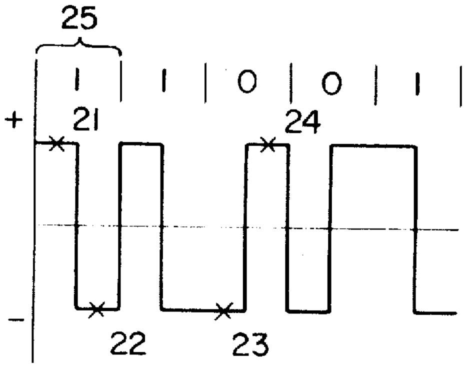
| | $C_2$ | $C_1$ | No. OF "1" BITS |
|---|---|---|---|
| RECEIVE | 0 | 1 | 0-3-6 |
| | 0 | 0 | 1-4 |
| | 1 | 0 | 2-5 |
| TRANSMIT | 0 | 1 | 1-4 |
| | 0 | 0 | 2-5 |
| | 1 | 0 | 0-3-6 |
| FILL | 1 | 1 | |
FIG_8
INVENTORS
WILLIAM H. BRIDGE
DONALD J. BIRMINGHAM
RALPH WILLIAM AUSTAD
BY
Flehr, Hohbach, Test, Albritton and Herbert
ATTORNEYS INVENTORS
WILLIAM H. BRIDGE
DONALD J. BIRMINGHAM
RALPH WILLIAM AUSTAD
BY Flehr, Hohbach, Test, Albritton and Herbert
ATTORNEYS

INVENTORS
WILLIAM H. BRIDGE
DONALD J. BIRMINGHAM
RALPH WILLIAM AUSTAD

BY
Flehr, Hohbach, Test, Albritton and Herbert
ATTORNEYS

FIG_5A

| POLL | | | | | | | | |
|---|---|---|---|---|---|---|---|---|
| 0 | 0 | 0 | 0 | 0 | 0 | 0 | 0 | LINE CONDITION |
| $C_2$ | $C_1$ | X | X | X | X | X | 1 | ADDRESS |
| $C_2$ | $C_1$ | 0 | 0 | 0 | X | 0 | 1 | POLL COMMAND |

X: 1 - TIME & ATTENDANCE POLL; 0 - STATUS POLL

FIG_5B

| LOAD CONTROL COMMAND ONLY | | | | | | | | | BYTE COUNTER | | | |
|---|---|---|---|---|---|---|---|---|---|---|---|---|
| $C_2$ | $C_1$ | $B_6$ | $B_5$ | $B_4$ | $B_3$ | $B_2$ | $B_1$ | | $D_4$ | $D_3$ | $D_2$ | $D_1$ |
| 0 | 0 | 0 | 0 | 0 | 0 | 0 | 0 | LINE CONDITION | 0 | 0 | 0 | 0 |
| $C_2$ | $C_1$ | X | X | X | X | X | 1 | ADDRESS | 0 | 0 | 0 | 0 |
| 0 | 0 | 0 | 0 | 0 | 0 | 1 | 0 | CONTROL MESSAGE | 0 | 0 | 0 | 1 |
| $C_2$ | $C_1$ | X | X | X | X | X | X | CONTROL REG. | 0 | 0 | 1 | 0 |
| $C_2$ | $C_1$ | X | X | X | X | X | X | SYSTEM COUNTER | 0 | 0 | 1 | 1 |

FIG_5C

| LOAD PROGRAM | | | | | | | | | BYTE COUNTER | | | |
|---|---|---|---|---|---|---|---|---|---|---|---|---|
| $C_2$ | $C_1$ | $B_6$ | $B_5$ | $B_4$ | $B_3$ | $B_2$ | $B_1$ | | $D_4$ | $D_3$ | $D_2$ | $D_1$ |
| 0 | 0 | 0 | 0 | 0 | 0 | 0 | 0 | LINE CONDITION | 0 | 0 | 0 | 0 |
| $C_2$ | $C_1$ | X | X | X | X | X | 1 | ADDRESS | 0 | 0 | 0 | 0 |
| 1 | 0 | 0 | 0 | 0 | 0 | 1 | 1 | LOAD COMMAND | 0 | 0 | 0 | 1 |
| BINARY DATA RELATED TO PROGRAM SELECTED | | | | | | | | CONTROL REG. | 0 | 0 | 1 | 0 |
| | | | | | | | | GEN. PURPOSE RH | 0 | 0 | 1 | 1 |
| | | | | | | | | VARIABLE J | 0 | 1 | 0 | 0 |
| | | | | | | | | " I | 0 | 1 | 0 | 1 |
| | | | | | | | | " H | 0 | 1 | 1 | 0 |
| | | | | | | | | " G | 0 | 1 | 1 | 1 |
| | | | | | | | | " F | 1 | 0 | 0 | 0 |
| | | | | | | | | " E | 1 | 0 | 0 | 1 |
| | | | | | | | | " D | 1 | 0 | 1 | 0 |
| | | | | | | | | " C | 1 | 0 | 1 | 1 |
| | | | | | | | | " B | 1 | 1 | 0 | 0 |
| | | | | | | | | " A | 1 | 1 | 0 | 1 |
| | | | | | | | | GP LH | 1 | 1 | 1 | 0 |
| | | | | | | | | SYSTEM COUNTER | 1 | 1 | 1 | 1 |

INVENTORS
WILLIAM H. BRIDGE
DONALD J. BIRMINGHAM
RALPH WILLIAM AUSTAD
BY
Flehr, Hohbach, Test, Albritton and Herbert
ATTORNEYS

| DIGIT DIS-PLAYED | A | B | C | D | E | F | G |
|---|---|---|---|---|---|---|---|
| 0 | 1 | 1 | 1 | 1 | 0 | 1 | 1 |
| 1 | 1 | 0 | 0 | 0 | 0 | 1 | 0 |
| 2 | 1 | 0 | 1 | 1 | 1 | 0 | 1 |
| 3 | 1 | 0 | 0 | 1 | 1 | 1 | 1 |
| 4 | 1 | 1 | 0 | 0 | 1 | 1 | 0 |
| 5 | 0 | 1 | 0 | 1 | 1 | 1 | 1 |
| 6 | 0 | 1 | 1 | 1 | 1 | 1 | 1 |
| 7 | 1 | 0 | 0 | 1 | 0 | 1 | 0 |
| 8 | 1 | 1 | 1 | 1 | 1 | 1 | 1 |
| 9 | 1 | 1 | 0 | 1 | 1 | 1 | 1 |
| – | 0 | 0 | 0 | 0 | 1 | 0 | 0 |
| (BLANK) | 0 | 0 | 0 | 0 | 0 | 0 | 0 |

STORED IN REGISTERS 36A-E ADDED BY CONVERTERS 39A-E

INVENTORS
WILLIAM H. BRIDGE
DONALD J. BIRMINGHAM
RALPH WILLIAM AUSTAD
BY
Flehr, Hohbach, Test, Albritton and Herbert
ATTORNEYS

FIG_7

SYSTEM CONTROL COUNTER

| DECIMAL COUNT | | | | | | | | |
|---|---|---|---|---|---|---|---|---|
| | 0 | 0 | 0 | 0 | 0 | 0 | | |
| 4 | 0 | 0 | 0 | 1 | 0 | 0 | READY FOR BADGE INPUT | |
| 5 | 0 | 0 | 0 | 1 | 0 | 1 | CARD 1 | |
| 6 | 0 | 0 | 0 | 1 | 1 | 0 | CARD 2 (VARIABLE) | |
| 7 | 0 | 0 | 0 | 1 | 1 | 1 | CARD 3 (VARIABLE) | |
| 8 | 0 | 0 | 1 | 0 | 0 | 0 | VARIABLE | |
| 9 | 0 | 0 | 1 | 0 | 0 | 1 | " | |
| 10 | 0 | 0 | 1 | 0 | 1 | 0 | " | |
| 11 | 0 | 0 | 1 | 0 | 1 | 1 | " | |
| 12 | 0 | 0 | 1 | 1 | 0 | 0 | " | |
| 13 | 0 | 0 | 1 | 1 | 0 | 1 | " | |
| 14 | 0 | 0 | 1 | 1 | 1 | 0 | " | |
| 15 | 0 | 0 | 1 | 1 | 1 | 1 | " | |
| 16 | 0 | 1 | 0 | 0 | 0 | 0 | READY TO TRANSMIT | |
| 17 | 0 | 1 | 0 | 0 | 0 | 1 | TRANSMIT BUTTON PUSHED | |
| 48 | 1 | 1 | 0 | 0 | 0 | 0 | TRANSMIT ENABLE | |
| 49 | 1 | 1 | 0 | 0 | 0 | 1 | BADGE POSITION 1 & 2 | |
| 50 | 1 | 1 | 0 | 0 | 1 | 0 | " " 3 & 4 | |
| 51 | 1 | 1 | 0 | 0 | 1 | 1 | " " 5 & 6 | |
| 52 | 1 | 1 | 0 | 1 | 0 | 0 | " " 7 & 8 | |
| 53 | 1 | 1 | 0 | 1 | 0 | 1 | " " 9 & 10 | TERMINATE ← IN TIME & ATTEND |
| 54 | 1 | 1 | 0 | 1 | 1 | 0 | VARIABLE 1 | |
| 55 | 1 | 1 | 0 | 1 | 1 | 1 | " 2 | |
| 56 | 1 | 1 | 1 | 0 | 0 | 0 | " 3 | |
| 57 | 1 | 1 | 1 | 0 | 0 | 1 | " 4 | |
| 58 | 1 | 1 | 1 | 0 | 1 | 0 | " 5 | |
| 59 | 1 | 1 | 1 | 0 | 1 | 1 | " 6 | |
| 60 | 1 | 1 | 1 | 1 | 0 | 0 | " 7 | |
| 61 | 1 | 1 | 1 | 1 | 0 | 1 | " 8 | |
| 62 | 1 | 1 | 1 | 1 | 1 | 0 | " 9 | |
| 63 | 1 | 1 | 1 | 1 | 1 | 1 | " 10 | |
| 32 | 1 | 0 | 0 | 0 | 0 | 0 | SCANNER ON | |
| 33 | 1 | 0 | 0 | 0 | 0 | 1 | SCANNER (DOWN & BACK) | |
| 34 | 1 | 0 | 0 | 0 | 1 | 0 | SCANNER FINISHED | |

INVENTORS
WILLIAM H. BRIDGE
DONALD J. BIRMINGHAM
RALPH WILLIAM AUSTAD
BY
Flehr, Hohbach, Test, Albritton and Herbert
ATTORNEYS United States Patent Office 3,454,936

Patented July 8, 1969

3,454,936

METHOD OF AND SYSTEM FOR INTERROGATING A PLURALITY OF SOURCES OF DATA

William H. Bridge, Los Altos Hills, Donald J. Birmingham, Mountain View, and Ralph William Austad, San Jose, Calif., assignors to Data Pathing Incorporated, Palo Alto, Calif., a corporation of California Filed Nov. 14, 1966, Ser. No. 593,811
Int. Cl. G11b *13/00;* G06f *15/00*
U.S. Cl. 340—172.5 25 Claims

ABSTRACT OF THE DISCLOSURE

Method and system for interrogating a plurality of sources of data each source of data having a plurality of different types of predetermined data. A central computer station is provided with a plurality of programs each of the programs corresponding to one of the data types. A selected program is transmitted from the central station to a specific satellite station in response to a request for this particular program. The program causes the satellite station to request information from the data source which is thereafter entered.

The present invention is directed to a method of an system for interrogating a plurality of sources of data and more specifically to a method and system where the sources of data possess a plurality of different types of predetermined data and where, after its collection, data is stored in a central computer station.

With the ever-increasing computerization in business today, the efficient collection of data to be supplied to a computer system has become an absolute necessity. Such information ideally should be rapidly collected from many different locations of the business in question in a form immediately suitable for computer use, and the collection means must serve a multiple of purposes. For example, at the present time there are collection systems where the worker "punches in" in the morning with a time card which has a computer language on it, the punch-in information being fed directly on line to a central computer station. Similar systems are also available for other practices, but all are still in a very elementary form.

In order to effectively utilize the efficiencies of computerization, it is necessary that data collection be done with both speed and accuracy.

It is, therefore, a general object of the invention to provide an improved method of and system for interrogating a plurality of sources of data.

It is another object of the invention to provide a method and system as above which is both accurate and fast.

It is still another object of the invention to provide a method and system as above in which several different types of data sources may be interrogated.

It is still another object of the invention to provide a method of and system for interrogating a plurality of sources of data which easily and accurately converts such data into computer language.

It is another object of the invention to provide a method of interrogating a plurality of sources of data which is simple and economical.

In accordance with the above objects, there is provided a method of interrogating a plurality of sources of data, such sources possessing a plurality of different types of predetermined data and thereafter storing such data in a central computer station. The method comprises the steps of providing the central computer station with a plurality of programs, each of the programs corresponding to one of the data types. A number of satellite computer stations are coupled to the central station and a selected program is transmitted from the central station to one of the satellite stations in response to a request for a program from this satellite computer station. The selected program is then stored in a satellite computer station and thereafter this station, under the control of the program, requests information from a data source which, for example, may be a human being, and which supplies the requested information by feeding responsive data into the satellite staton. Such responsive data is then stored in the satellite station and transmitted to the central computer station during a single, continuous, predetermined time interval.

Further objects and features of the invention will become apparent from the accompanying drawings and the following description.

Referring to the drawings:

FIGURE 1 is a block diagram showing a representative system embodying the present invention including satellite computers coupled to a central computer;

FIGURE 4 is a waveform used in the present invention;

Figures 5D, 6:
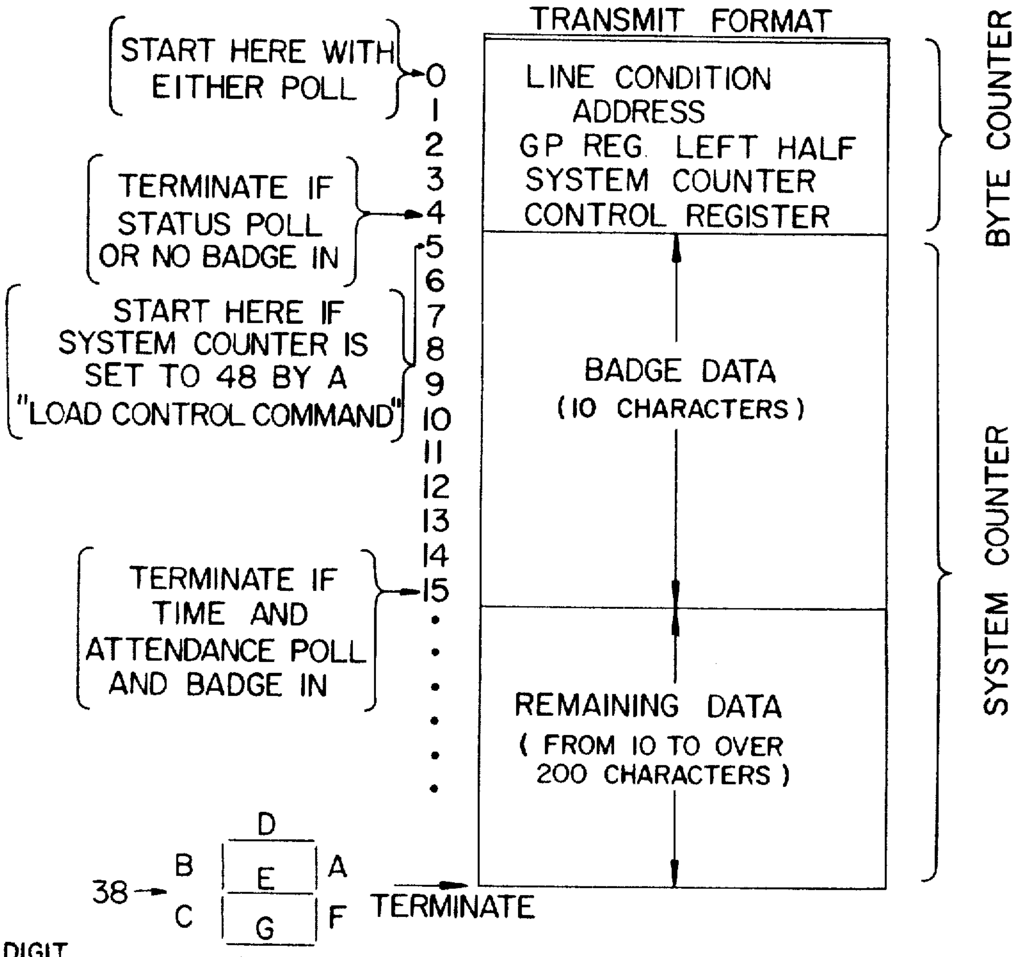

FIGURES 5A–D are tabulations of computer instructions and data;

FIGURE 6 is a code conversion table;

FIGURE 7 is a counting table showing the functioning of a system control counter of a satellite; and FIGURE 8 is a table showing the modulus of 3 checking used in the present invention.

FIGURE 1 shows a typical system layout where a master computer station 10 is coupled to three strings of satellite computer stations designated 11, 12 and 13. Each string may include fifteen satellite computer stations. For example, string 11 includes stations 11*a* through 11*n*. Each string is coupled to the central computer station by means of transmit-receive buffers 16, 17 and 18, respectively. The three strings, 11, 12 and 13, of satellite computers feed essentially into only a single input in the central computer station since this unit can operate at a much faster rate than the activity which takes place on any of the lines. Thus, by periodically scanning each of the three strings, the central computer station 10 has sufficient time capacity to handle concurrently the three computer strings. The computer stations on a single line are sequentially polled by the central computer.

Although a central computer discussed above may be of standard design a copending application in the names of Donald J. Birmingham and Ralph W. Austad, filed Nov. 22, 1967, Ser. No. 685,073, entitled "Data Processing System and Method" and assigned to the present assignee discloses a specialized central computer ideally suited for the present invention.

Figure 2:
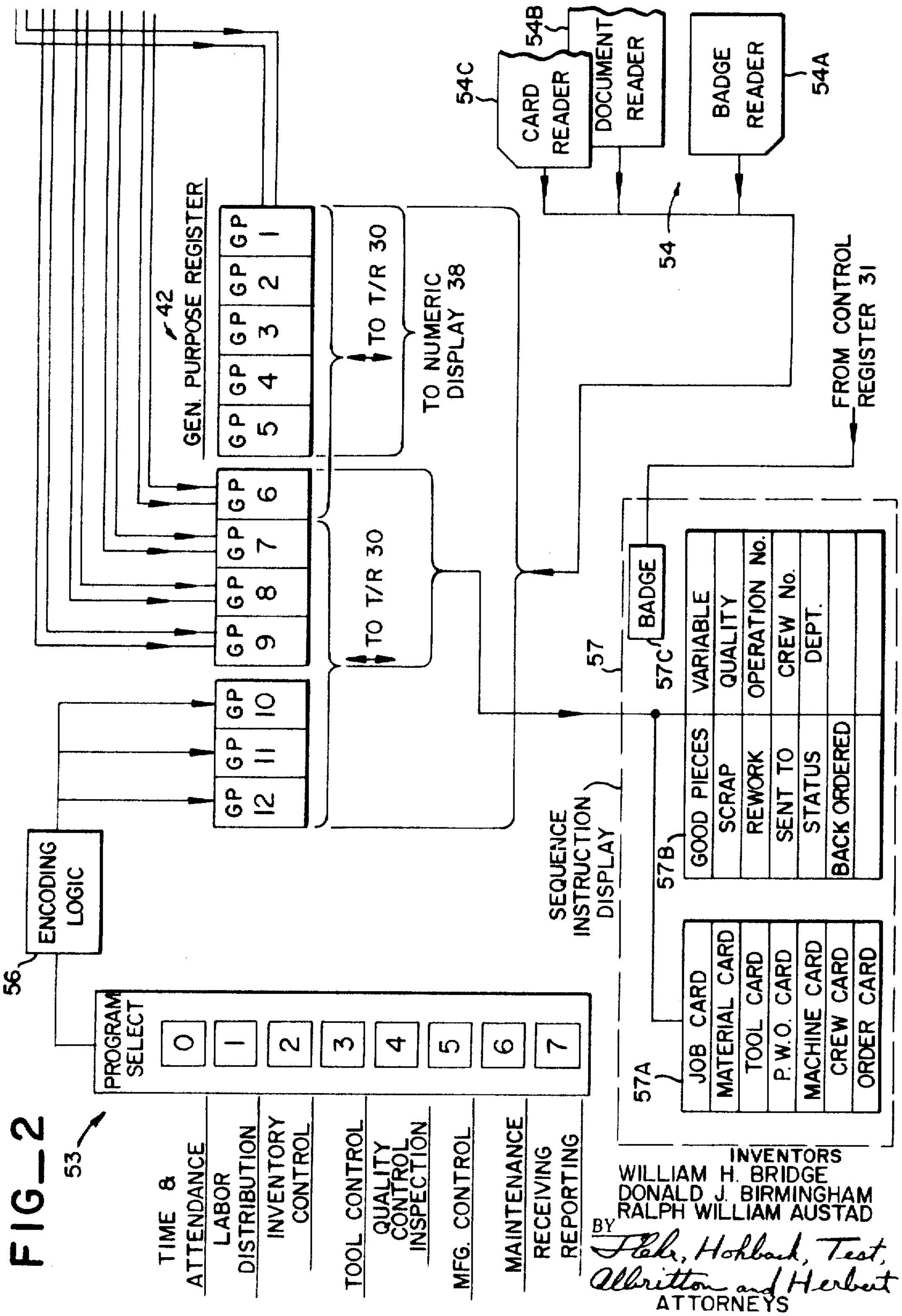
FIGURES 2 and 3 are detailed block diagrams of a satellite computer.
Figure 3:
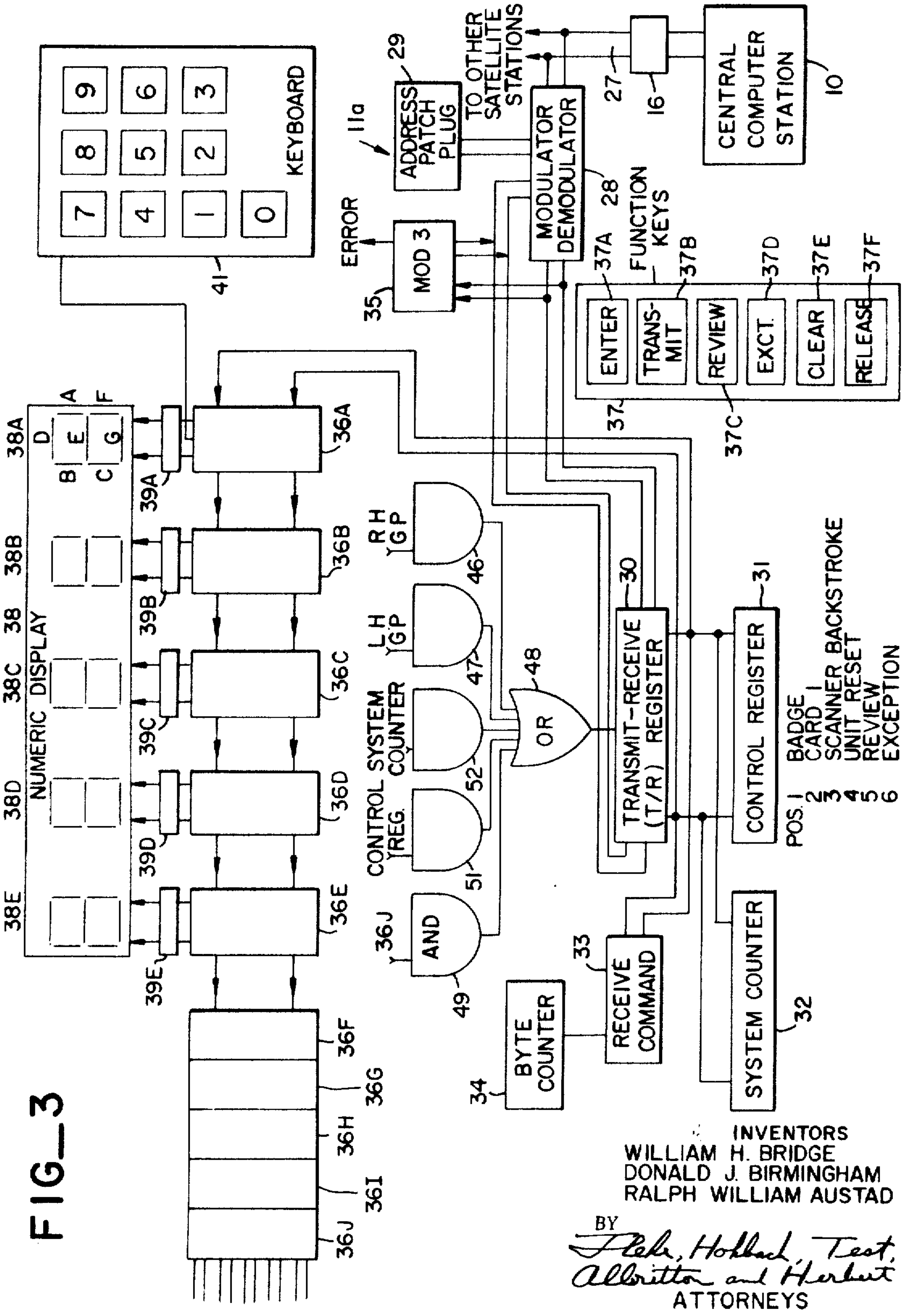

FIGURES 2 and 3 disclose a single satellite computer station coupled by means of a two wire line to the central computer station 10. Communication between the central computer station 10 and all of the satellite computers is conducted by means of a binary computer language of the type shown in FIGURE 4. This is known as a phase modulation binary coding where, as illustrated in the figure, a binary "1" is a change during the indicated bit period 25 from a plus to a minus, indicated by points 21 and 22, and a binary "0" is represented by a change from minus to plus (23, 24). The bit periods, 25, may be timed either by an external timing pulse which is synchronized with the binary pulse train, or internally timed by means which sense the transition from one polarity level to another. The phase modulation coding provides a transition at the center of each bit period permitting synchronization of a received signal to be performed on each bit. Phase modulation also provides a balanced signal which can be AC coupled by means of capacitors or transformers without introducing problems of DC biases dependent on the sequence of binary "ones" and "zeros."

Phase modulation as used here is equivalent to non-return-to-zero (NRZ) coding with each binary digit followed immediately by an odd parity bit. The modulator-demodulator 28 (FIGURE 3) tests each bit of a message to verify that the polarity during the second half of the bit period is the inverse of that during the first half. If any bit fails this test the message is rejected as invalid.

In the operation of the computer system, binary information is sometimes transmitted from central computer station 10 over the two wire line 27 to a modulator, demodulator (Mod-Demod) device 28 which is included in each satellite computer station, and, at other times, binary information is transmitted from the Mod-Demod to the central computer station. The Mod-Demod device itself functions to either convert the information on line 27 to standard voltage information suitable for application to, for example, a flip-flop circuit of a satellite computer, or, conversely, to convert these internal computer voltages to the phase modulation waveform for transmission to central computer station 10.

An address patch plug 29 containing the specific and unique address of its satellite computer is coupled to Mod-Demod 28. Any information or data sent by the central computer station to the satellite before being received must contain the proper address. Thus, the address patch acts as a type of gating circuit which prevents the reception of any binary data or instructions from the central computer until it has identified this data as having a proper address. It follows, of course, with reference to FIGURE 1 that each of the forty-five satellite computers indicated there has its own unique address so that the central computer may communicate solely with a selected satellite.

A transmit-receive (T/R) register 30 is coupled to Mod-Demod 28 and functions as a converting device which either receives serial information from Mod-Demod 28 which has been received from the central computer station, and converts it to parallel format, or collects information and binary data in parallel format from the storage components of the satellite computer and transmits it to the Mod-Demod device in serial format for subsequent transmission to the central computer station.

Error checking of both transmitted and received binary information is accomplished by a type of "mod 3" error checker 35 which is coupled to the input and output lines of Mod-Demod device 28. Each character or byte consists of 8 bits, two of which are check bits, $C_1$ and $C_2$ which are related to the number of "1" bits remaining the byte as shown in FIGURE 8. Separate check codes for transmit and receive ensures high accuracy and prevents other transmitters from locking onto the transmitter which is sending information to the central station receiver. The "11" combination is reserved for a fill character as discussed below to maintain synchronism.

A command register controls the operation of the satellite station and includes a control register 31, a system control counter 32, a receive command device 33, and a byte counter 34, all of which are coupled to transmit-receive register 30. In addition devices 30–33 are coupled to data storage units 36A–36J which are standard binary circuit elements capable of storing five bits of information. Counter 34 is a control element which determines the flow of certain binary data but is not capable of being loaded itself. Function keys 37A–37F, which are operable by the user of the satellite station, as will be explained in detail below, are also coupled to control register 31.

A numeric display unit 38 is responsive to and coupled to storage units 36A–36E and include five numeric displays 38A–38E, each of which corresponds to the similarly lettered storage devices 36. Each single numeric display 38 is coupled to its corresponding storage device 36 by a converter device 39 which converts between the five bit storage of the storage devices 36 to the seven segment numeric display of devices 38, as indicated specifically by numeric 38A which includes segments A–G. Each of the five bits is related to a specific segment, A–D, of the numeric display to selectively illuminate the segment. Since five segments are sufficient to designate a numeral from zero through nine and a dash, five bits is the storage capability of elements 36. However, to allow the user of the satellite to recognize the numeral in typical form, the converters add, at the appropriate time, either one or both of the missing elements. Referring to numeric 38A, these elements are F or G and the table of FIGURE 6 illustrates by a "1" marking when these additional elements are needed, and in addition, which elements are used with which numbers. The dash after the "9" in the table is for the purpose of indicating the number of digits which are to be placed into the numeric display by the operation of a keyboard 41 which the user of the satellite station may operate as an input to the satellite computer.

Storage devices 36A–36J are controlled in such a manner that any five bit binary data placed into storage element 36A is shifted along successively through all of the subsequent storage elements until reaching storage element 36J. At this point the five bits of binary information in this last storage element are coupled by means of the two wire lines shown to a general purpose register 42 (FIGURE 2).

Register 42 has twelve components which are numbered on the drawing, and each component is capable of storing one bit. The general purpose register is divided into a left half containing elements 7–12, and a right half containing elements 1–6. Storage element 36J directly couples four of its bits to register elements 6–9. The fifth bit is coupled to element one of serially connected elements 1–5 which are arranged so that subsequent bit inputs cause a shift from right to left as indicated by the arrows. Elements 1–5 are coupled to numeric display 38.

Binary information which is fed into elements 1–5 of the register controls the dashes in the numeric display which, as stated above, are for the purpose of providing a visual indication to the user of the satellite station how many numerals are required for entry of variable information. The specific dash is the E segment of the numeral and is provided when a "1" bit is entered into one of the elements 1–5 of register 42.

Both the left half and right half element groups of register 42 are coupled to the input of transmit-receive register 30 through "AND" logic devices 46 and 47, respectively. Actually one "AND" element would be provided for each register element but only two are shown for simplifying the drawing. The outputs of the "AND" elements are coupled into an "OR" element 48 which has its output coupled to an input terminal of T/R register 30. The "AND" logic element in accordance with well known theory, serves as a coincidence gate so that an input must be received on all of the terminals for an output to be generated. The other inputs are not shown but would include gating pulses from the system counter. The "OR" logic element requires only an input on any one of its input terminals for an output to be generated.

Other inputs to "OR" logic element 48 are from storage element 36J which feeds into "AND" logic element 49, and inputs from the control register 31 and system counter 32 which are coupled into "AND" logic elements 51 and 52. The output of the "OR" logic element 48 is in parallel format and is converted to serial format through the transmit-receive register 30 which then couples into the modulator, demodulator 38 and to the central computer station 10.

The general purpose register 42 has two other inputs of information in addition to that from the storage unit 36J. These are from a program selector device 53 and from reader devices 54. More specifically, the program selector functions to allow the operator of the satellite control station to select the type of program which will correspond to the type of data he wishes to select. For example, eight programs are listed, each with its specific type of data, such as time and attendance, labor distribution, etc. The program selector is coupled through an encoding logic device 56 to elements 10, 11 and 12 of the general purpose register. Thus, when the left half of the general purpose register is sampled by the central computer station, the program selected is indicated by the three bits of information in units 10, 11 and 12. The other input 54 includes a badge reader 54A, a document reader 54B and a card reader 54C. These would normally read Hollerith type punch cards, or alternatively magnetic codes, reflective mark codes, perforated documents, or transparent documents with opaque codes. These readers are coupled into all twelve units of the general purpose register. The register, when the reader is operating, sequentially stores the information from the reader which is retransmitted to the transmit-receive register 30.

From an output standpoint, the general purpose register, as already mentioned, transmits its data to the transmit-receive register 30 and provides an indication of the number of digits to be entered by keyboard 41 into numeric display 38. In addition, a major function of the general purpose register is to illuminate a selected single instruction of sequence instruction display 57. This display unit contains several instruction lists, basically broken down into the card instruction list 57A, the VARIABLE information display 57B, and the badge display 57C. The displays consist of translucent panels which may be lighted to provide a visual indication to the user when this type of information is required. For example, in display 57A when the JOB CARD is lighted the user should then insert his JOB CARD in the card reader 54C. Similarly, when the Badge indicator is lighted, the badge should be inserted. Lastly, VARIABLE quantities, such as GOOD PIECES, SCRAP, etc., listed on display 57B are placed into the satellite station by the use of the Keyboard 41. Sequence instruction display 57 is controlled by the unit 6–9 of general purpose register 42 and by control register 31.

*Operation*

For the purpose of explaining the operation of the system of the present invention, a typical situation will be chosen involving a Quality Control Inspection transaction. Here, the information desired will be first the badge of the worker entering the quality control information, then the JOB CARD which is of the Hollerith type punch card indicating the type of product of which the Quality Control Inspection is being made. The VARIABLE information which would be necessary and for which the system must interrogate the worker, consists of the following, the number of digits being indicated in parentheses after the information:

(1) GOOD PIECES (4 digits);
(2) SCRAP (3 digits);
(3) OPERATION NUMBER (2 digits).

It will be seen that these VARIABLE information classes are contained on the instruction panel 57B; the JOB CARD requirement has a visual indication on 57A, and the badge on 57C. The satellite station would normally be located in a convenient place relative to where the quality control inspection is being carried on. The worker approaches the satellite station and selects the proper program from program selector 53 in which he is specifically interested. This would be the program of Quality Control Inspection. Upon pressing this button, three bits of information are provided by encoding logic device 56 and fed into the general purpose register units 10, 11 and 12. In addition to a human data source, the present system is also adaptable for use with machine type inputs.

Central computer station 10 has, during the preceding period, been continuously polling all of the satellite stations connectd to it. The polling message (FIGURE 5A) consists of two characters in this computer design, each character or byte containing eight bits. Six of the bits, $B_1$–$B_6$, are data or instruction bits, and the other two, $C_1$ and $C_2$, check bits, which check on a modified modulus of three basis (FIGURE 8). Pairs of bits used for this are 00, 01, and 10; the "11" combination is used to indicate a fill character.

The type of transmission used is synchronous. Fill bits are used when, for example, a card is being read since the reader does not have an output speed equal to the transmission capability of the system. With the use of synchronous transmission, the character rate is relatively high as opposed to asynchronous transmission since no framing bits are necessary for each character.

As illustrated in FIGURE 5A, a series of zeros are initially transmitted by the central station to establish proper timing conditions. When the first "1" is received (bit $B_1$ in address), this indicates a satellite address of 5 bits ($B_2$–$B_6$) will follow. All satellites check this address but only the proper one will lock onto the line.

After the satellite has locked onto the central station the second character of the polling message is a control or command character to which the receive-command device 33 is responsive. It consists of three bits, $B_1$–$B_3$, the "01" portion ($B_1$, $B_2$) including a poll and the $B_3$ bit indicating a status poll if "0" and a time and attendance poll if "1." A time and attendance poll is used in recording employee attendance when the employee inserts his badge into the badge reader.

When an "01" command is received, this indicates that the central computer station is polling the satellite stations to see if either (1) the satellite station is requesting a program to be sent to it, or (2) the satellite station is ready to transmit collected data to the central computer station. As mentioned above, the satellite station will only respond to this polling message if the address directed to it matches the address of the address patch plug 29 which is assigned to that particular satellite station. Assuming this is the case, in answer to the polling message, the receive-command device 33, by means of byte counter 34, causes the satellite station to transmit over the two wire line 27 to the central computer station 10 the following as shown in FIGURE 5D): (1) address; (2) the left half of general purpose register 42 (GP LH); (3) the contents of control register 31; and (4) the contents of system counter 32.

The satellite station can indicate by means of the contents of these registers whether it is in the process of collecting information, requires a program, is totally inactive, or is ready to transmit collected data. In the case where it is totally inactive, the left half of the general purpose register will, of course, be empty since no transaction program has been requested. Where the unit is in the process of collecting information, the system counter will indicate such by being in an intermediate stage. Similarly, where the satellite station is ready to transmit its collected information, the system counter will be in a "ready to transmit" stage which can be detected by the central computer station. If this is the case, control is transferred to system counter 32, as indicated in FIGURE 5D and data is sent out as will be explained in greater detail below. Finally, and referring again to the specific operational program which is being considered, if a program has been selected by a user and the satellite station is awaiting transmission of this program from the central computer station, the left hand portion of the general purpose register (specifically units 10, 11 and 12) indicates which program is desired, and the system counter will have been reset to all zeros indicating that no processing is in progress and the program can now be fed into the satellite computer by the central computer. Upon this indication, the central computer sends a load command "11" (see FIGURE 5C) and the program is fed into the satellite computer under the control of byte counter 34. The instructions are shifted along serially in storage units 36 until a JOB CARD request instruction is placed in the general purpose register units 6–9.

The total instruction list which the central computer station loads into the specific satellite computer of the present invention as shown in FIGURE 5C consists of sixteen characters. These begin with the address, load command, and, thereafter, the general purpose register is loaded with the JOB CARD request and the VARIABLES 1–10 instructions are loaded into the storage units 36A–36J. As will be explained below, control register 31 is placed in a badge request condition (pos. 1) and system counter 32 is placed in a "4" count condition — "Ready for Badge Input."

As illustrated in FIGURE 3 (see tabulation below control register 31) the control register has preset into it a fixed program sequence of six positions. Badge input is the first position. There are also Card 1, Scanner Backstroke, Unit Reset, Review and Exception positions. The load full instruction sets the control register to cause it to activate "Badge" display 57C. Insertion of a badge will then move the control register to position 2 (Card 1) and the system counter will add "1" to its count. If no badge/card is required, the initial commands to the system counter and control register cause the satellite station to sequence through these positions without taking any action.

The system counter control actions are illustrated in FIGURE 7 in binary code. Decimal counts 4–17 designate the receive type operations when data is being fed into the satellite station, and decimal counts 48–63 and 32, 33, 34 designate the transmit operations to the central computer.

The function related to the specific count is indicated in the right hand column, starting with the "ready for program selection." Cards 2 and 3 are listed as VARIABLES since either a card may be inserted during these counts, or VARIABLE information punched in on keyboard 41, depending on the program selected.

Initially, referring back to the Quality Control Inspection program, the first information required was a badge input. The control register, in its position one, is at the badge position and activates the sequence instruction display panel to light the badge request light 57C. In operation, the user inserts his badge in badge reader 54A which causes the system counter to add a count placing it in the "Card 1" condition; the control register maintains this count since it has been programmed to "flag" the counter for this "Card 1" information. The control register and system counter cause a shift of the card instruction data which was stored in units 6–9 of the general purpose register to visual display unit 57A where this bit information lights up the JOB CARD indicator. In response to this request for information, the operator inserts his particular JOB CARD in card reader 54C. Insertion of the card causes the system counter to count to its "6" or "card 2" position. However, since the Quality Control Inspection requires no other cards, the VARIABLE information as to GOOD PIECES, SCRAP and OPERATION NUMBER must now be entered. As mentioned before, the GOOD PIECES will require four digits to display.

Thus, to review a moment, initially the instruction as to what specific card is required is contained in the general purpose register units 6–9. The last storage unit, 36J, contains, at this time, the beginning of the VARIABLE information instruction program. Since four digits of information is required in this case, four dashes must be indicated on numeric display panel 38. Thus, the top bit of the five bit instruction in storage units 36G, 36H, 36I and 36J must all have a "1" indication which will thereafter be sent to general purpose register units 1, 2, 3 and 4 to illuminate dashes in display units 38A–38D. The number of digits that the satellite computer requests for specific VARIABLE information is determined by the location of the VARIABLE information instruction in storage units 36. For example, storage unit 36G will contain specific four bit binary data that the VARIABLE required is GOOD PIECES and the previous storage elements 36H, I and J will contain no instruction but only the top bit dash indication.

Now, returning to the sequence of operation, the satellite computer has first accepted a badge in its reader 54A; this caused the counter 32 to count 1 to the "Card 1" position causing the card instruction which had been placed in the units 6–9 of the general purpose register to be shifted out to illuminate the JOB CARD display and the contents of storage unit 36J to be shifted into units 6–9 of general purpose register 42. Insertion of a JOB CARD in reader 54C adds another count to system counter 32, causing the instruction program to shift again. However, since unit 6–9 contains no instruction or all "zeros" because this represents only the first digit of the four digits required for GOOD PIECES, shifting continues until the contents of storage unit 36G is shifted into general purpose register 42 and then out to the sequence instruction display 57B. The GOOD PIECES indicator light goes on at this time. After there have been four shifts, the right half units 1–4 of the general purpose register are each loaded with a "1" bit. A final shift couples this information to display panel 38 to illuminate four dashes on the panel and the VARIABLE section of display 57B giving a double indication that VARIABLE information is now required.

The user of the device, in response to the display, punches into keyboard 41 four digits which are stored in storage unit 36A–36D and which, since there were five shifts, are now vacant of instruction characters. The numbers are illuminated on numeric display panel 38 and if correct, the operator punches "ENTER" function key 37A. This clears the display panel and causes the system counter to shift or count once more and again start the sequence of operations exactly as above for further VARIABLE information. It is readily apparent that if a further card or document was required, the program could be modified to use document reader 54B before going into the VARIABLE information segment of the program.

Continuing with the Quality Control Inspection program, the next information required is the SCRAP VARIABLE information. System counter 32 causes the storage units to shift three times and on the third shift, the SCRAP light is illuminated on panel 57B along with three dashes on display 38. Finally, the same occurs with the OPERATION NUMBER which is two digits. After all the data is entered, the system counter has counted up to its position 16 which is the "Ready to transmit" position which causes "Transmit" button 37B to be illuminated. The operator of the device, realizing that he has entered all information, punches the "Transmit" button which moves system counter 32 to count 17. This is an indication to the central computer that data is ready to be transmitted.

Storage units 36A–36J serve a double function since they store both the initial program information and as the program is executed the variable data is stored. Thus, in the "Ready to Transmit" condition the program information has been totally destroyed. Such double use of storage provides a significant cost saving in a satellite station.

When the central computer polls the satellite as discussed above in connection with FIGURES 5A and 5D, it recognizes that the system counter is in its ready to transmit position with the transmit button pushed, and at this point, the control of the statellite computer is transferred from the central computer station to the system counter which is shifted to its "Transmit Enable" count 48. The system counter is shifted to count 48 by loading it from the central computer station with the count 48 in a "Load Control Command" as defined in FIGURE 5B. To avoid transmitting the badge information before the satellite station is in the ready to transmit position, only the status poll as defined in FIGURE 5A is used by the central computer station to poll a satellite station which has an active program loaded in it. As indicated by FIGURES 7 and 5D, the badge which has previously been inserted, is read, there being ten characters on the badge. Each character contains six bits and therefore the badge supplies one character to the left half of the general purpose register, units 1–6. This is fed into "AND" units 47 and 48 and then to transmit-receive regiser 30 and to the central computer station. The badge is read and thereafter the system counter starts to shift the stored data which has been entered in units 36 until all units are empty, which is indicated as "count 63" in the system control counter. Thereafter the counter causes the reading of the JOB CARD placed in the card reader 54C in the same manner as the badge reader, and this information is sent out on the line to central computer station. The scan return is for the purpose of reading edge punched cards which may be placed in the same card reader. If an edge punched card is not to be read, as is the case in the present example, the scan return or backstroke will not produce any data and this condition will be indicated by position 3, scanner backstroke, of control register 31. The control register is placed in this position by the card reader 54C being in its midway condition (when the forward scan is completed) and by the fact that the initial loaded program conditioned control register 31 to be responsive to the scan condition. Upon completion of the scan the counter shifts to the "Scanner Finished" count. If all the information transmitted is correct, the central computer station will send its acknowledgement which will clear the satellite of all data and reset the system counter to zero. This is accomplished by the UNIT RESET (position 4) of control register 31 which is responsive to a good message acknowledgement.

If the information is not in proper form or some interference occurs, then a retransmit signal is sent which will cause the system control counter to go through the transmit sequence once again. Data is still stored in units 36 at this time, since during the initial feed out the data was concurrent circulated back into the storage units. Until the acknowledgment is received, the satellite station is held in an active state. An important system feature is that the satellite station does not hold the communicaion line while waiting for acknowledgement. This is the case since acknowledgment is just another one of the control messages that the central computer station sends to the satellite. When the message is received, the central station can go on polling other terminals while simultaneously validating the message. This feature allows a group of messages to be batched, recorded on magnetic tape, and the recording re-read for validation before the satellite is released. It also is important for on-line systems where the message is sent from the central station to another computer. This other computer might require a second to validate and acknowledge that it received a good message. In the meantime, the central station can continue to poll and receive messages from other satellites while the first satellite is awaiting acknowledgement.

In the above operational example a Quality Control Inspection program was selected. However, the normal mode of a satellite station is to be ready for a "time and attendance" recording. In other words the system counter is in a "Ready for Badge Input" condition and the instruction panel 57 has the BADGE instruction illuminated. The operator need only insert his badge into the badge receptacle and the attendance recording is made automatically. The badge is automatically mechanically held in the Badge Reader 54A until an acknowledgment is received by the satellite from the control station. The special time attendance poll command "101" (FIGURE 5A) causes data transmission (FIGURES 5D and 7) to terminate immediately after the badge is read. An acknowledgment resets the system counter to zero, releases the badge, and its subsequent removal by the operator shifts the counter to its initial "Ready for Badge Input" position.

The system counter and control register may be loaded at any time with a specific position number or count as illustrated in FIGURE 5B. Here a Control MESSAGE of "10" is sensed by Receive Command device 33 causing byte counter 34 to load the control register and/or system counter with the specific instructions. In this manner, for example, a partial readout of data may be obtained if desired. Furthermore, a program such as "Quality Control Inspection" may be started at any point by resetting the system counter.

Function keys 37 provide the operator with several other options. For example, the eight computer programs are not limiting, but by pressing the exception button 37D, the exception position (position 6) of control register 31 is set to "1" to request an exception program and the exception button is illuminated. The manner in which this operates is that the exception program request is detected by the central computer station when it examines the response to its poll of the satellite station. The central computer station then transmits a special program to the satellite requesting a badge and a 22-column hollerith card. An appropriately coded 22-column card and the operators badge are entered into the satellite. On the next poll of the satellite the card and badge information are sent to the central computer station. The information punched in the card provides the format data which the central computer station uses to generate a special program for the desired data entry. This generated program is then sent to the satellite station and executed in a manner similar to the other eight programs which may be specified by the program select button 53. The satellite terminal contains no special features other than the exception button 37D and the control register exception position for the execution of an exception routine. The format card, the exception program, and the actual exception data entry are all handled by the basic features of the satellite under the control of special programs in the central computer station.

The review button 37C provides another option in a manner similar to the exception button. When it is pressed position 5 of the control register 31 to set to "1." The central computer station can detect this and initiate another set of special programs. The review programs allow the operator to review and verify the data already entered into the terminal prior to operating the transmit button.

During a regular program, if an erroneous number has been entered, pressing the clear button 37A will erase and the proper number can be entered. Finally, the release button 37F provides for a total incompatability of the system with the operator by cleaning the satellite station of all of its information and freeing the central computer station. Release button 37F is illuminated, indicating to the operator that the message transmitted was bad, by the control station sending a control message which places the system counter in a "request release" position. This is a special intermediate count "21" between counts "17" and "48" (FIGURE 7) which does not take part in the ordinary sequential operation of the system counter. The counter remains in this condition until the release button is pressed by the operator to reset it to "zero."

A second special count "20" is also provided in the system counter where the central terminal may place the transmitter "off the line;" in other words, inactivate it.

In summary, the present invention provides an information collection system which consists of a central computer station with satellite computers which are extremely flexible in that their program is supplied by the central computer. Moreover, the central computer is used very efficiently since it sequences or scans through several satellite computer stations, and, when data is to be transmitted, it is done in a single, continuous, predetermined time interval and not normally in bits and segments. Other efficiencies are obtained by use of the five bit numeric display which is converted to the seven bit visual display for lighting the number segments. This is a saving in cost of two bits per storage unit. In addition, only a two wire line is required between the central computer station and the satellite which makes installation of the system very simple. The general purpose register is used with great effectiveness in providing the multiple functions of identifying the program transaction, the type of VARIABLE or card required, and, in addition, the length of the VARIABLE. This is done without expensive interconnecting links between the control register which would normally occur in a standard computer.

The central computer station has not been discussed in detail, but could be fully standard and require only the type of programming which would allow the transmitter to function as discussed above.

What is claimed is:

1. In a method of interrogating a plurality of sources of data possessing a plurality of different types of predetermined data and storing such data in a central computer station comprising the steps of providing said central computer station with a plurality of programs, each of said programs corresponding to one of said data types, providing a plurality of satellite computer stations coupled to and remote from said central station, transmitting a selected program from said central station to one of said satellite stations in response to a request for a program from the satellite computer station, storing said selected program in said satellite station, such satellite station, thereafter, under the control of said program, requesting information from a data source, said data source supplying said requested information by feeding responsive data into such satellite station, storing such responsive data in said satellite station, and transmitting such data to said central station during a single coninuous predetermined time interval.

2. In a method according to claim 1 in which each satellite computer station is provided with a unique address and only information from said central computer identified by such address is processed by said satellite station.

3. In a method according to claim 1 in which said satellite computer stations are sequentially polled by said central station and each of said satellite stations responds with information indicative of either being inactive, requiring one of said programs, in the process of acquiring data from a data source, or being in a condition of having collected all required data and being ready to transmit such data to said central station.

4. In a method according to claim 1 in which said central computer station, after receiving such data, acknowledges such reception by either clearing said satellite station of all remaining data or requesting a retransmission of such data.

5. In a method according to claim 1 in which a source of data feeds responsive data into a satellite station, such data is checked by said source for accuracy and thereafter such data is entered permanently by said source of data.

6. In a method according to claim 1 in which a source of data causes a satellite computer station to indicate to the central station that such satellite station is ready to transmit data to the central station.

7. In a method according to claim 1 in which said satellite station is maintained in an inactive condition after transmitting said data to said central station and before receiving an acknowledgement of valid reception from said central station.

8. In a method according to claim 7 in which said central station communicates with other satellite stations during said inactive condition.

9. In a method according to claim 1 in which messages from said central station to a satellite station are checked for errors by a first set of check codes and messages from satellite station to said central station are checked for error by a second and different set of check codes.

10. In a method according to claim 1 in which said satellite computer normally is ready to receive data of a predetermined type in the absence of a program request.

11. In a method according to claim 10 in which this data is time and attendance of an employee.

12. In a method according to claim 1 in which said stored program is destroyed as the program is executed.

13. In a method according to claim 1 in which data is transmitted between said central computer and each of said satellite stations in a serial binary format.

14. In a method according to claim 13 in which the serial binary format is transmitted in phase modulation coding.

15. In a method according to claim 14 in which each bit is tested by the receiving device to verify that the polarity of the received signal during the second half of each bit period is the inverse of the polarity received during the first half, and identifying as invalid a message in which any bit fails to pass this test.

16. In a method according to claim 13 in which the message format consists of a conditioning code of one or more binary zeros and a first binary one where said binary zeros are used as the initial phase reference for locking onto bit synchronism and the first binary one is the first bit of the first information character which establishes character synchronism for the message.

17. In a method according to claim 1 in which said program is provided by program data supplied by said data source to said satellite station, including the steps of said central computer receiving said program data and thereafter retransmitting such program to said satellite station and storing such program in said satellite station.

18. In a system for interrogating a plurality of sources of data possessing a plurality of different types of predetermined data, such system comprising a centra computer station for storing such data, such station having a plurality of computer programs, each of said programs corresponding to one of said data types; a plurality of satellite computer stations coupled to and remote from said central station; means included in said central computer station and responsive to a request for a program from a satellite computer station for transmitting a selected program from the central station to the satellite station; means included in said satellite station for storing such program; means, included in said satellite station, including a system counter, responsive to said program for requesting information form a data source and accepting and storing responsive data to said requested information in the satellite station; and means included in said central computer station and responsive to the condition of said system counter for causing said satelliate station to transmit such data to said central station during a single continuous predetermined time interval.

19. In a system according to claim 18 in which illuminated numeric display means are provided for visually indicating data fed into a satellite station by a data source.

20. In a system according to claim 19 in which said numeric display means comprises a plurality of numeric displays each consisting of seven segments which may be illuminated and which are laid out to form the numeral 8 in block, and also comprises activating means for illuminating selected segments of such numeric displays, said activating means providing five bits of binary information for each numeral to be illuminated each of such bits being associated with a particular and different segment, and converter means coupled between said activating means and said numeric display means for converting such five bit information to seven bit information for selectively illuminating said remaining two segments of each of said numeric displays whereby visually readable numbers are formed.

21. In a system according to claim 20 in which said five bits are associated with the upper four segments and lower left segment of the block 8 configuration.

22. In a system according to claim 18 in which said central computer station is coupled to each of said satellite stations solely by two wires.

23. In a system according to claim 18 in which said satellite station includes error checking means for checking the validity of messages from said central station to a satellite station with a first set of check codes and for checking messages from a satellite station to said central station by a second set of check codes, each of said codes using permutations of "0" and "1" except for the permutation "11".

24. In a system according to claim 23 in which means are provided in each satellite station for causing synchronous transmission of information to said central station said permutation "11" being used to designate a fill character.

25. In a system according to claim 18 in which said program storage means also stores said responsibe data.

References Cited

UNITED STATES PATENTS

| | | | |
|---|---|---|---|
| Re. 26,171 | 3/1967 | Falkoff | 340—172.5 |
| 3,335,407 | 8/1967 | Lange et al. | 340—172.5 |
| 3,297,996 | 1/1967 | Grady | 340—172.5 |
| 3,295,108 | 12/1966 | Harris et al. | 340—172.5 |
| 3,281,797 | 10/1966 | Harris | 340—172.5 |
| 3,281,796 | 10/1966 | Neel | 340—172.5 |
| 3,277,443 | 10/1966 | Harris et al. | 340—172.5 X |
| 3,263,219 | 7/1966 | Brun et al. | 340—172.5 |
| 3,223,976 | 12/1965 | Abbott et al. | 340—172.5 X |

GARETH D. SHAW, *Primary Examiner*.